United States Patent Office 3,337,414
Patented Aug. 22, 1967

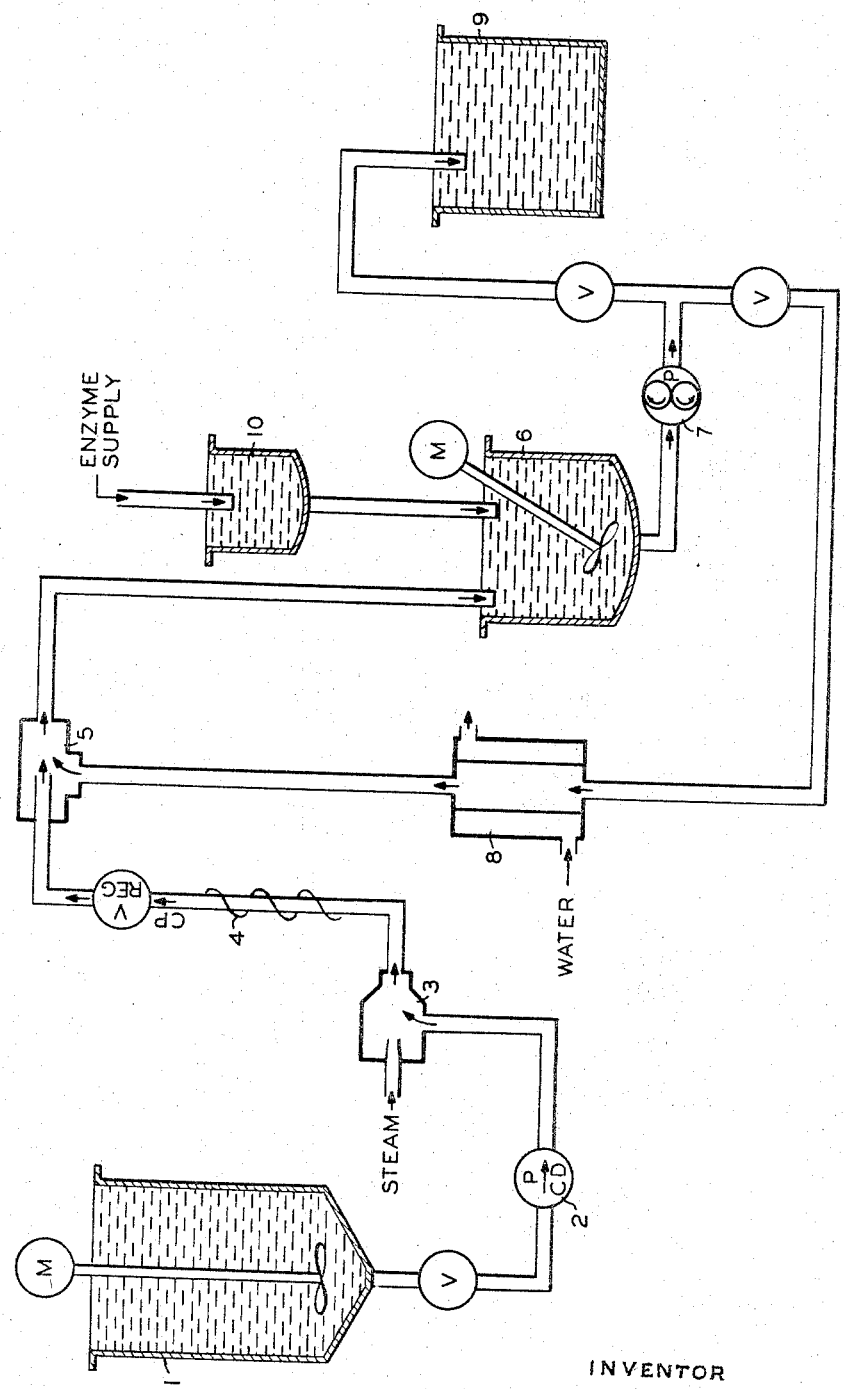

3,337,414
SACCHARIFICATION OF STARCH
Alexander L. Wilson, Palos Park, Ill., assignor to Corn Products Company, New York, N.Y., a corporation of Delaware
Filed Dec. 31, 1963, Ser. No. 334,709
17 Claims. (Cl. 195—31)

This invention relates to a process for the total enzymatic saccharification of starch. More particularly it relates to efficient conversions of starch, in a high solids system, to dextrose or maltose.

My broad objective is a practical means for achieving the high sugar yields which are theoretically attainable by totally enzymatic hydrolysis of starch. As is well known, the traditional acid process under conditions of optimum economy yields a product having a dextrose content of 86–87%. Within the past few years, the detrose industry has been shifting rapidly to a mixed acid-enzyme process which obtains dextrose at yields of 92–93%. The attraction of potential yields of 97–98% dextrose from an enzymatic process is off-set by the nature and magnitude of the apparent problems.

The first problem is over-all yield, that is, the amount of recoverable hydrolyzate in relation to the starch input. For current processes, an estimated minimum yield of hydrolysate is 98%. This allows for native non-starch components in a typical corn starch and for small losses of starch substance that escapes or resists hydrolysis. Any lower yield is undesirable by reason of the filtration difficulty and hazy filtrates that result at appreciable levels of unconverted starch. It is such starch in retrograded, enzyme-resistant form that plagues a totally enzymatic process for starch conversion. This retrogradation is a reaction that is exaggerated during the early course of hydrolysis of gelatinized starch at the moderate temperature prevailing during enzyme action. Its obviation by lowering starch concentration or by elevating enzyme dosage is uneconomical.

Concentration of starch undergoing hydrolysis is at least as critical as yield in the total economy of a sugar process. The more dilute the system, the larger the equipment and the greater the evaporative load. Whereas the older acid process operated at 9–10° Bé., or at a water-starch ratio of 4 to 1, the acid-enzyme process is effective at 19° Bé., or at a water-starch ratio of 2 to 1. The savings in steam, in addition to the gain in yield more than compensates for the added enzyme costs and lengthened holding time. Operation at a high starch concentration, with its accentuation of retrogradation, becomes crucial in enzyme-enzyme conversion of starch. An object of my invention is a means for total saccharification of starch in an aqueous slurry having a gravity of 16 to 20° Bé. and higher if suitable equipment is available.

The known art of enzymatic saccharification of starch is extravagant in terms of the amount of enzyme required. The process is typically divided into distinct steps of thinning and saccharification. The first is conducted at or above the gelatinization temperature of the starch with a purely liquefying enzyme, such as a bacterial amylase, or on occasion with a malt enzyme under conditions where the saccharifying component is inactivated. Temperature is then lowered and other conditions changed for a more prolonged treatment with a distinct dextrogenic enzyme such as fungal amylase or with a new increment of malt to develop β-amylase action. Not only is the total usage of enzyme high due to double dosage but also due to the massive dosage of liquefying enzyme needed to counter retrogradation during the thinning step and during the transfer of the system to the lower temperature conditions for saccharification.

It is a particular object of my invention to minimize enzyme requirements by thinning the starch under conditions such that saccharification can proceed also. The two phases of starch conversion are thus carried out simultaneously and there is a full and conjoint utilization of the separate hydrolytic activities found in commonly available enzyme preparations.

Another object is to provide a novel and efficient means for converting starch at high solids concentration.

A further object is a continuous mode of operation suitable for large scale manufacturing.

I have discovered that if a starch slurry is first thoroughly solubilized by pasting at a temperature substantially above the gelatinization temperature, then blended into a mass of previously thinned and partially saccharified starch and subjected simultaneously to the action of both liquefying and saccharifying enzymes, at a temperature below the gelatinization temperature, losses due to retrogradation or insolubilization are minimized, the starch can be handled at higher solids content than heretofore and high yields of sugars are obtained.

The process of my invention is an integrated whole which cannot be broken down into distinctly exclusive steps, i.e., the thinning and saccharifying cannot be separated entirely. For convenience in exposition, however, it may be discussed in the four phases of: (1) starch preparation, (2) dilution blending, (3) presaccharification conditions, and (4) final saccharification. Refining and recovery of the sugars produced are carried out in accordance with known techniques.

*Presaccharification conditions*

The process starts with the transformation of starch by physical means to a state of maximum susceptibility to attack by enzyme. My aim is to provide a clear, homogeneous solution of starch having a high solids content and viscosity suitable to be pumped and handled in commercially available equipment. This is obtained in part by the combined effects of high temperature and shear. A preferred temperature range is 130–160° C. for a period as short as a few seconds under the shear produced by rapid flow in a pipe line. Temperatures as low as about 120° C. may be effective when working at lower starch concentrations, or with more violent and prolonged agitation. Temperatures as high as 180° C. are not harmful. Pressures either correspond to the normal pressure of water at the given liquid temperatures or may be higher due to non-equilibration of input steam or needs for a higher driving force to mobilize starch flow. Operating conditions with pressures up to 150 p.s.i. have been used. The gravity of the starch slurry used should be within the range of about 16° Bé. to 20° Bé.

Starch solutions as prepared at the preferred temperature range are relatively stable at the temperature of preparation and due to the absence of residual granule crystallites may be cooled somewhat without retrogradation but cooling to the temperature where gelation occurs should be avoided. I prefer, however, that the starch solution be produced continuously and that it be passed rapidly and continuously through any cooling stage prior to subsequent blending.

The preferred partial cooling step, if used, is a flash evaporation at or above atmospheric pressure. This accomplishes two purposes. It permits an instantaneous drop to a temperature which approaches 100° C. It also accomplishes recovery of much of the heat absorbed by the hot liquid as well as of any excess steam that was not absorbed in the short period of contact. It will be understood that the prior heating step, in view of the viscous character of pasted starch, is almost necessarily mediated by direct injection of steam to provide heat transfer as well as useful turbulence.

It is important that the finally prepared starch solution have the proper viscosity and be non-retrograded.

This character can be obtained in a properly pretreated starch solution an initial gravity of 16–20° Bé. and at a temperature as low as 100° C. At somewhat lower gravities, somewhat lower temperatures can be reached before solidification of the pretreated starch solution occurs.

Dilution blending

The next step is the introduction of the pretreated starch solution into a thinning and presaccharification zone. The operation employs the concept of dilution as an effective means to avoid retrogradation.

As diluent, I use enzymatically active, preformed partial hydrolyzate just as it is in turn produced in this operating step. Into this hydrolyzate the hot, fluid starch solution as prepared above is introduced continuously and preferably with instantaneous blending. It is thereby highly diluted, and its substrate becomes freely accessible to enzyme attack. The new starch is thinned in a menstruum of older starch which has already undergone some major thinning and partial saccharification.

The equipment requisite for this step is preferably a holding tank at or about atmospheric pressure arranged with agitation, means for cooling and temperature control. It is arranged for reception of incoming liquor, enzyme and pH controlling agents as well as for continuous removal of product. The capacity is such that: (1) the incoming stream is relatively small in relation to the total liquor and (2) the holding time is such that starch is largely thinned and in stable form for saccharification. A satisfactory holding time with practical enzyme dosage is 1 to 3 hours. The time can be reduced if more enzyme is used; however, it is preferred that it could not be lengthened merely to reach the same stage of conversion with less enzyme. The time and holding capacity can obviously be extended if it is desired to reach a higher level of saccharification approaching the final desired degree of hydrolysis, in the single step. The unit may be multiple.

Efficient blending of the incoming stream is imperative. This stream is hot and fluid but subject to setting up and retrograding as its temperautre is lowered. The steady state liquor on the other hand contains enzyme which is susceptible to deactivation at high temperatures. A useful technique is to cool a stream of the steady state liquor, in a volume and to the temperature to match the excess heat of the inlet stream, and secure intimate and rapid blending in a mix-T. This T may be over or under the surface of liquid in the holding tank. The two streams may be blended almost as effectively by direct impingement, one on the other, below the liquor surface and close to the impeller of the tank agitator. Less effectively, the incoming stream may be blended directly into the mass of liquor in the vortex of a fast agitation. In this case, heat removal may be by way of internal coils and jacketing.

Presaccharification conditions

The next step involves the addition of enzyme and the maintenance of suitable conditions for enzymatic conversion. Operation is adjusted to accomplish conjoint thinning and saccharification.

There are naturally occurring enzyme systems that are fairly well balanced in liquefying and saccharogenic compounds. It turns out that several display activity patterns which permit one to specify a single condition for effective conjoint action of the components. In other cases, certain enzyme blends are mutually reinforcing.

To produce dextrose from starch I prefer to use an enzyme from the culture of certain strains of the *Aspergillus miger* group. Preparation of satisfactory enzyme systems has been described in U.S. Patents 3,012,944 and 3,042,584. Those that are rich in that type of α-amylase which shows high temperature resistance and maximum activity at low pH are especially useful. Suitable conditions for conjoint action with the major glucamylase component include a pH range of 3.5–5.0 and a temperature range of 55–65° C.

To produce the fermentable sugars, maltose and maltotriose, from starch, I prefer the enzymes of barley malt. These may be obtained from ground whole malt or indirectly by extraction. The α- and β-anmylase components are effective in conjoint action in the pH range of 4.5–5.5 and at a temperature of 50–60° C. Added calcium ion is useful.

Other enzyme systems may be employed. Preparations from the *Aspergillus flavus-oryzae* group are useful in producing mixtures of dextrose and maltose. Satisfactory conditions include a pH of 4.0–5.5 and a temperature of 45–55° C. Again, malt α-amylase can be used as a supplement to glucamylase preparations of low liquefying activity. The pH should be above 4.0 and the temperature should not be above 60° C. It is also possible to supplement β-amylase action from malt with α-amylase action from *B. subtilis* by operating at pH 5.0–6.0.

Accordingly, the conditions to be maintained in the thinning cycle are set by the nature of the enzyme system employed. In general, the substrate liquid is to be kept at a steady state by continuous or incremental addition of enzyme, pH adjustment, and by addition of enzyme activators or stabilizers at a rate proportioned to the input of fresh starch solution.

The degree of hydrolysis which typifies a satisfactory steady state condition varies in detail with the enzyme system, the desired product and the design needs. There is a basic requirement for a viscosity such that it serves as an effective diluent for incoming starch and such that it may be handled with low power agitation in the finish converters. In respect to extent of hydrolysis, a D.E. in the range of 10–60, for example, has been found satisfactory for *Aspergillus niger* conversions to dextrose. A preferred range here is 28–45 D.E. For malt conversions, equivalent thinning is found in a D.E. range of 10–40.

In general, the level of hydrolysis of the steady state liquor is superior to what might be predicted from a knowledge of independently operated thinning and saccharifying steps. Both thinning and saccharification appear to proceed further under conjoint enzyme attack than under individual treatment. In this respect, the effect is synergistic, rather than being simply additive.

Final saccharification

Liquor from the primary enzyme converter as shown on the drawing hereinafter is withdrawn continuously to holding tanks (final converter) where saccharification is allowed to proceed to completion.

There need be no further addition of enzyme nor change in pH or temperature, although minor pH adjustment may be desirable and additional enzyme may be added. Thus, in one manner of operation with mixed fungal or mixed malt enzyme, the total dosage of enzyme is charged initially. In this way, advantage is taken of the total available liquefying component in the step where its need is greatest. Conditions in the enzyme primary converter in this case are set to provide maximum preservation of saccharification activity.

Consideration can be given, however, to situations which suggest a different economic balance in enzyme usage. When two enzyme sources are available, one richer in α-amylase activity, the other richer perhaps in glucamylase activity, the former could well be used in the primary converter, with small additions of the latter to the final converter. Again, it might be economical to reduce the size of the primary converter by operating at a pH and temperature more suitable for rapid thinning at the expense of substantial destruction of saccharifying activity. More or different enzyme will then be added in the final step, along with adjustment of conditions to provide for its more effective utilization.

For the production of dextrose, final saccharification may be allowed to proceed for 3 to 4 days or more at a typical temperature near 60° C. and at a pH near 4. The final liquor will have a D.E. value in the range of 98–100 percent. For the production of maltose, a more rapid saccharification is ordinarily practiced. Suitable conditions would include a temperature near 55° C. and a pH near 5. Final D.E. will probably be about 52–56 percent.

The final product is treated, filtered, refined and recovered in customary manner as finished syrup or sugar for specific uses in the food, fermentation or chemical arts.

*Experimental*

An experimental setup for carrying out one mode of operation of this invention is shown in the figure. It comprises essentially a starch supply tank 1, a primary ensymatic converter 6 and multiple saccharification tanks 9 (final converter). In operation, starch slurry is conducted via screw pump 2 through a steam injection heater 3. Here the starch is pasted under turbulent agitation at high temperature. During flow through the steam-traced pipe 4 it is transformed to a clear, high solids solution. It issues through a pressure regulated valve into a mix-T 5 where it is instantaneously blended with a recycled stream of cooled, partially hydrolyzed liquor. The mixture passes directly into the mass of strongly agitated liquor of the primary converter. Here it is held at constant temperature in the presence of thinning and saccharifying enzyme. This ensyme enters from a constant head supply tank 10 in proportion to starch flow. A stream of partial hydrolyzate from 6 is continuously pumped by gear pump 7 to furnish recycle for cooling in heat exchanger 8 and to bleed off primary product, in proportion to starch input, to final converters 9. In 9 it is held at a fixed temperature under agitation for a time sufficient to complete saccharification.

Summarized in Table I are the major data from a series of experimental runs involved in the conversion of corn starch to dextrose with the process being conducted according to the described flow.

In carrying out these runs, the supply tank was filled with wet starch. This was pumped during the operation at a constant rate of 0.5 g.p.m. The ensyme converter was initially partly filled with water. During operation the converter liquid was pumped at a constant rate of 16 g.p.m. through the heat exchanger. The blended stream temperature averaged 71° C. over a short distance from the mix-T to a submerged inlet in the converting liquor. When the liquor volume reached the level for the set holding time, hydrolyzate was withdrawn continuously. Samples were held under gentle agitation for 60–100 hours at about 60° C. for measurement of final conversion. Two values were determined: Yield of filtrate in terms of total dry substance and yield of dextrose in terms of D.E. of filtrate.

Three enzyme preparations were employed. Preparations M and C were transglucosidase-free, α-amylase and glucamylase-containing enzyme concentrates from *Aspergillus niger* cultures. Units of activity, glucamylase basis, were measured as described in U.S. Patent 3,042,584. Enzyme T was ground barley malt used at 0.2% by weight of starch.

TABLE I

| Series | I | II | III | IV |
|---|---|---|---|---|
| Number of runs | 4 | 3 | 5 | 9 |
| Supply starch, Bé | 20 | 20 | 20 | 21.5 |
| Pasting temperature, °C | 141–8 | 142–51 | 160–80 | 166 |
| Hold time, seconds | 3 | 3 | 60 | 40 |
| Primary converter temperature, °C | 60–1 | 60–1 | 60–5 | 60 |
| Hold time, minutes | 50–140 | 100 | 100 | 100 |
| pH | 4.3–5.0 | 4.3–5.0 | 4.2–5.0 | 4.1–4.3 |
| Enzyme | M | M | C | C+T |
| Glucamylase units | 14–17 | 17 | 17–24 | 21–28 |
| Final yield of hydrolysate, percent of D.S. | 97–9 | 99 | 97–9 | 97–9 |
| Final D.E. of recovered hydrolysate | 96–8 | 98 | 98–9 | 98–9 |

The runs were, generally, successful. At steady state conditions, fluid hydrolyzate was obtained from the converter and this was satisfactorily saccharified. The goal of a fast-filtering product at 98% yield and 98–99% sugar content was attained under a range of operating conditions.

Pasting temperatures as low as 133° C. for 3 seconds holding, or of 135° C. for 1 minute holding, were borderline with respect to smooth flow in the given system. Operation was mechanically well controlled at temperatures of 151–157° C. regardless of holding time. Temperatures as high as 180° C. held for 1 minute were satisfactory but not of certain benefit.

Optimum holding time in the primary converter was about 100 minutes. The 50-minute holding time tended towards lower yields. Actually, the extent of hydrolysis at this station may be varied over wide ranges, such as D.E. 20 to D.E. 60 without an adverse effect on the product from the final step.

Several operating improvements were developed in subsequent study. A flash-cooling chamber was inserted in the line carrying hot starch solution. This functioned well at somewhat above atmospheric pressure to reduce greatly the total cooling load as well as to reduce the stream dilution caused by free and absorbed steam. With this change, the mix-T became better located beneath the liquid surface of the primary converter. Both changes reduced the temperature and the time of contact of recycled liquor with hot starch solution and thus eliminated this source of enzyme deactivation.

Runs were also made successfully in a similar manner with sweet potato starch. An example of a conversion of sweet potato starch follows.

A slurry of sweet potato starch at 21° Bé. was heated with direct steam to 155° C. for a holding time of 60 seconds at 96 p.s.i.g. Thereafter the stream was passed to a flash chamber under 6 p.s.i.g. where the temperature dropped to 103° C. From here it was conducted to a T where it was blended with cooled recycle, in a 12/1 ratio (recycle to starch), to a temperature of 62° C. In the primary converter, holding conditions included pH 4.1, 60° C., 17° Bé., an average holding time of 100 minutes and an average D.E. of 16. Steady state liquor was quite fluid at this low extent of saccharification. Enzyme added here was from an *Aspergillus niger* culture of high α-amylase content. The dosage was 8 glucamylase units. Final saccharification was at 60° C. for 112 hours with an additional 8 units of a high glucamylase enzyme. Final yield was 99.7%; hydrolyzate D.E. was 98.

I claim:
1. A process for the enzymatic saccharification of starch comprising the steps of
   (1) dissolving starch in water at a temperature exceeding 100° C., and
   (2) continuously blending the starch solution with a mass of thinned and partially saccharified starch containing liquefying and saccharifying enzymes, adding liquefying and saccharifying enzymes to the blend and maintaining the blend at a temperature of 45–70° C., to effect conversion of the starch.

2. A process for the enzymatic conversion of starch to dextrose comprising the steps of
   (1) dissolving starch in water in a temperature exceeding 100° C., and
   (2) continuously blending the starch solution with a mass of thinned and partially saccharified starch containing liquefying and dextrose-producing enzymes, adding liquefying and saccharifying enzymes to the blend, and maintaining the blend at a temperature of 45–70° C., to effect conversion of the starch.

3. A process for enzymatic saccharification of starch comprising the steps of
   (1) dissolving starch in water at a temperature exceeding 100° C.,
   (2) rapidly cooling the resulting starch solution, and
   (3) continuously blending the cooled starch solution with a mass of thinned and partially saccharified starch containing liquefying and saccharifying enzymes, adding liquefying and saccharifying enzymes to the blend, and maintaining the blend at a temperature of 45 to 70° C., to effect conversion of the starch.

4. A process for the enzymatic conversion of starch to dextrose comprising the steps of
   (1) dissolving starch in water at a temperature exceeding 100° C.,
   (2) rapidly cooling the resulting starch solution, and
   (3) continuously blending the cooled starch solution into a mass of thinned and partially saccharified starch containing liquefying and dextrose-producing enzymes, adding liquefying and saccharifying enzymes to the blend, and maintaining the blend at a temperature of 45 to 70° C., to effect conversion of the starch.

5. A process for the enzymatic saccharification of starch comprising the steps of
   (1) dissolving starch in water at a temperature exceeding 100° C.,
   (2) rapidly cooling the resulting starch solution,
   (3) continuously blending the cooled starch solution with thinned and partially saccharified starch containing liquefying and saccharifying enzymes, adding liquefying and saccharifying enzymes to the blend, and maintaining the blend at a temperature of 45 to 70° C., and
   (4) continuously passing the resulting thinned starch to a holding zone for completion of the saccharification reaction.

6. A process for the enzymatic conversion of starch to dextrose comprising the steps of
   (1) dissolving starch in water at a temperature exceeding 100° C.,
   (2) rapidly cooling the resulting starch solution,
   (3) continuously blending the cooled starch solution into a mass of thinned and partially saccharified starch containing liquefying and dextrose-producing enzymes, adding liquefying and saccharifying enzymes to the blend, and maintaining the blend at a temperature of 45 to 70° C., and
   (4) continuously passing the resulting thinned starch to a holding zone for completion of the dextrose formation.

7. A process for the enzymatic saccharification of starch comprising the steps of
   (1) dissolving starch in water at a temperature in the range of 120–180° C.,
   (2) rapidly cooling the resulting starch solution, and
   (3) continuously blending the starch solution with a mass of thinned and partially saccharified starch containing liquefying and saccharifying enzymes, adding liquefying and saccharifying enzymes to the blend, and maintaining the blend at a temperature of 45–70° C., to effect conversion of the starch.

8. A process for the enzymatic conversion of starch to dextrose comprising the steps of
   (1) dissolving starch in water at a temperature in the range of 120–180° C.,
   (2) rapidly cooling the resulting starch solution, and
   (3) continuously blending the starch solution with a mass of thinned and partially saccharified starch containing liquefying and dextrose-producing enzymes, adding liquefying and saccharifying enzymes to the blend, and maintaining the blend at a temperature of 45–70° C., to effect conversion of the starch.

9. A process for the enzymatic conversion of starch to dextrose comprising the steps of
   (1) dissolving starch in water at a temperature exceeding 100° C.,
   (2) continuously blending the starch solution with a mass of thinned and partially saccharified starch containing liquefying and saccharifying enzymes, adding liquefying and saccharifying enzymes to the blend, and maintaining the blend at a temperature of 45–70° C., and
   (3) continuously passing the resulting thinned and partially saccharified starch to a holding zone for completion of the saccharification reaction.

10. A process for the enzymatic conversion of starch to fermentable sugars comprising the steps of
    (1) heating starch and water at a temperature in excess of 100° C. to form a fluid solution,
    (2) continuously blending the starch solution into a mass of thinned and partially saccharified starch containing liquefying and saccharifying enzymes, adding liquefying and saccharifying enzymes to the blend,
    (3) holding the resulting blend at a temperature of 45–70° C. to thin and partially saccharify the starch, and
    (4) continuously withdrawing thinned and partially saccharified starch to a holding zone for completion of the saccharification reaction.

11. A process for the enzymatic conversion of starch to fermentable sugars comprising the steps of
    (1) heating starch and water at a temperature in excess of 100° C. to form a fluid solution,
    (2) continuously blending the starch solution into a mass of thinned and partially saccharified starch, containing liquefying and saccharifying enzymes,
    (3) adding liquefying and saccharifying enzymes to said blend and holding the mixture under conditions of conjoint thinning and saccharification, and
    (4) continuously withdrawing thinned and partially saccharified starch to a holding zone maintained under conditions for saccharification until the conversion is completed.

12. The process according to claim 11 wherein the temperature is in the range of 120° to 180° C. in Step 1.

13. The process according to claim 11 wherein the temperature for conjoint thinning and saccharification is in the range of 45° to 70° C.

14. The process according to claim 11 wherein the thinned and partially saccharified starch has a D.E. of 10 to 60 percent.

15. The process according to claim 11 wherein the fermentable sugar is dextrose.

16. The process according to claim 11 wherein the fluid solution of starch is cooled prior to blending with the thinned partially saccharified starch.

17. The process according to claim 11 wherein the initial gravity of the starch in Step 1 is about 16 to 20° Bé.

References Cited
UNITED STATES PATENTS
2,967,804  1/1961  Kerr _____ 195—11 X
3,039,935  6/1962  Rentschler et al. _____ 195—11

A. LOUIS MONACELL, *Primary Examiner.*

ALVIN E. TANENHOLTZ, *Examiner.*

UNITED STATES PATENT OFFICE
CERTIFICATE OF CORRECTION

Patent No. 3,337,414                                 August 22, 1967

Alexander L. Wilson

It is hereby certified that error appears in the above numbered patent requiring correction and that the said Letters Patent should read as corrected below.

Column 2, line 30, for "Presaccharification conditions", in italics, read -- Starch preparation --, in italics; column 3, line 2, after "solution" insert -- having --; line 68, for "miger" read -- niger --; column 4, line 4, for "anmylase" read -- amylase --; column 5, line 13, for "ensymatic" read -- enzymatic --; lines 25 and 39, for "ensyme", each occurrence, read -- enzyme --.

Signed and sealed this 29th day of October 1968.

(SEAL)
Attest:

Edward M. Fletcher, Jr.

Attesting Officer

EDWARD J. BRENNER

Commissioner of Patents